(12) United States Patent
Kuntze-Fechner et al.

(10) Patent No.: US 9,714,579 B2
(45) Date of Patent: Jul. 25, 2017

(54) CONNECTION JOINT FOR ATTACHING AN AIRFOIL BLADE TO A HELICOPTER'S BEARINGLESS MAIN ROTOR

(71) Applicant: AIRBUS HELICOPTERS DEUTSCHLAND GMBH, Donauworth (DE)

(72) Inventors: Gerald Kuntze-Fechner, Gmund am Tegernsee (DE); Markus Bauer, Munich (DE); Martin Ortner, Unterhaching (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 863 days.

(21) Appl. No.: 13/804,732

(22) Filed: Mar. 14, 2013

(65) Prior Publication Data

US 2013/0280076 A1    Oct. 24, 2013

(30) Foreign Application Priority Data

Apr. 18, 2012   (EP) .................................. 12 400012

(51) Int. Cl.
*F01D 5/30*     (2006.01)
*B64C 27/00*    (2006.01)
(Continued)

(52) U.S. Cl.
CPC ............... *F01D 5/30* (2013.01); *B64C 11/04* (2013.01); *B64C 27/00* (2013.01); *B64C 27/04* (2013.01);
(Continued)

(58) Field of Classification Search
CPC ......... B64C 27/50; B64C 27/33; B64C 27/48; B64C 27/322; B64C 24/04; B64C 27/00;
(Continued)

(56) References Cited

U.S. PATENT DOCUMENTS

| | | | | |
|---|---|---|---|---|
| 3,494,424 A | * | 2/1970 | Stanley | B64C 27/18 416/20 A |
| 4,086,024 A | * | 4/1978 | Weiland | B64C 27/51 416/107 |

(Continued)

FOREIGN PATENT DOCUMENTS

| | | |
|---|---|---|
| EP | 0315962 A2 | 5/1989 |
| WO | 2010082936 A1 | 7/2010 |

OTHER PUBLICATIONS

Search Report and Written Opinion; Application No. EP 12400012; dated Sep. 12, 2012.

*Primary Examiner* — Bryan Lettman
*Assistant Examiner* — Timothy Solak
(74) *Attorney, Agent, or Firm* — Brooks Kushman P.C.

(57) ABSTRACT

An airfoil blade (2) of a bearingless rotor of a helicopter. Said airfoil blade (2) has a pitch axis from a tip end to a root end and said root end is provided with junction means for a separable junction arrangement of said airfoil blade (2) with a flexbeam head (13), and a control cuff (4, 22). Said junction arrangement is mechanical with removable fasteners respectively removable connecting said root end of said airfoil blade (2) to said control cuff (4, 22) and said flexbeam head (13). Said root end comprises at least two openings (7, 8) being asymmetric with regard to said pitch axis.

20 Claims, 3 Drawing Sheets

(51) Int. Cl.
*B64C 27/54* (2006.01)
*B64C 27/04* (2006.01)
*B64C 11/04* (2006.01)
*B64C 27/33* (2006.01)
*B64C 27/50* (2006.01)

(52) U.S. Cl.
CPC .............. *B64C 27/33* (2013.01); *B64C 27/54* (2013.01); *B64C 27/50* (2013.01)

(58) Field of Classification Search
CPC ... B64C 27/54; B64C 2201/108; B64C 11/04; B64C 11/06; B64C 11/10; B64C 11/12; F01D 5/30
USPC ...................................................... 416/134 A
See application file for complete search history.

(56) References Cited

U.S. PATENT DOCUMENTS

| | | | | |
|---|---|---|---|---|
| 4,252,503 A | * | 2/1981 | Wackerle | B64C 27/001 416/134 A |
| 4,427,340 A | | 1/1984 | Metzger | |
| 4,601,639 A | * | 7/1986 | Yen | B64C 27/473 416/144 |
| 4,893,988 A | | 1/1990 | Sato | |
| 4,975,021 A | * | 12/1990 | Wagner | B64C 27/33 416/134 A |
| 5,096,380 A | | 3/1992 | Byrnes | |
| 5,263,821 A | * | 11/1993 | Noehren | B64C 27/33 415/115 |
| 5,415,525 A | * | 5/1995 | Desjardins | B64C 27/45 416/164 |
| 5,562,416 A | * | 10/1996 | Schmaling | B64C 27/48 416/134 A |
| 5,738,494 A | | 4/1998 | Schmaling | |
| 6,126,398 A | * | 10/2000 | Bauer | B64C 27/51 416/134 A |
| 6,196,800 B1 | * | 3/2001 | Bauer | B64C 27/33 416/107 |
| 2002/0081201 A1 | * | 6/2002 | Mondet | B64D 15/12 416/143 |
| 2008/0101934 A1 | | 5/2008 | Stamps | |
| 2011/0274548 A1 | | 11/2011 | Stamps | |
| 2012/0087797 A1 | | 4/2012 | Kuntze-Fechner | |
| 2013/0280075 A1 | * | 10/2013 | Kuntze-Fechner | B64C 27/33 416/204 R |

* cited by examiner

CONNECTION JOINT FOR ATTACHING AN AIRFOIL BLADE TO A HELICOPTER'S BEARINGLESS MAIN ROTOR

CROSS-REFERENCE TO RELATED APPLICATIONS

This application claims priority to European patent application No. 12 400012.6 filed Apr. 18, 2012, the disclosure of which is incorporated in its entirety by reference herein.

BACKGROUND OF THE INVENTION (1) Field of the Invention

The invention relates to an airfoil blade of a bearingless rotor of a helicopter with the features of claim 1.

(2) Description of Related Art

During operation, the rotor blades are deflected in various directions and are thereby subjected to high loads in these various directions. The rotor blades must be designed to withstand these high loads while still providing the required flexibility or articulation to allow the blades to carry out flapping, lead-lag oscillating, and pitch angle variation movements.

Typically, a rotor blade of a bearingless rotor includes a structural element known as a flexbeam at the inner end of the blade connected to the rotor head. The flexbeam supports and transmits the centrifugal forces of the blade into the rotor head. Additionally, the flexbeam includes at least portions or regions that are flexurally and torsionally soft or flexible to allow the blade to undergo the above mentioned movements in a flapping direction, a lead-lag direction, and in a pitch angle direction. The torsionally soft portion of the flexbeam is arranged within a torsionally stiff control cuff or torque tube, through which the pitch angle control movements are transmitted to the lift-generating airfoil blade portion of the rotor blade. The airfoil blade typically extends from the outboard end of the control cuff to the outermost end of the rotor blade, i.e. the blade tip.

The vibrations of the rotor blades, and particularly the oscillations in the lead-lag direction, must be damped by appropriate damping elements. The damping effectiveness of the damping elements is predominantly dependent on the effective transmission of the lead-lag oscillating movements of the airfoil blade into the damping elements. Any softness or lack of force transmission through the blade/cuff attachment to the damping element will reduce the total resulting damping effect.

In order to allow the flexbeam/cuff unit and/or the airfoil blade to be separately manufactured and/or replaced in the event of damage, or in order to allow the airfoil blade to be pivoted and folded relative to the flexbeam/cuff unit, it is desired to provide a separable or releasable junction between the flexbeam/cuff unit and the lift-generating airfoil blade.

The separable or releasable junction is subject to high technical and mechanical demands, because it must reliably carry and transmit the substantially high centrifugal forces resulting during rotation of the rotor blade and all bending moments from flapping and lead lag movements of the rotor blade. The rotor blade has a longitudinal main load axis next to 25% of the average airfoil chord of the blade profile, said main load axis being essentially covered by the pitch axis of said rotor blade. At the level of the flexbeam said longitudinal main load axis next to 25% of the average airfoil chord of the blade profile corresponds to a longitudinal middle axis of the flexbeam.

The document WO 2010/082936 A1 discloses a rotor assembly for a rotary-wing aircraft, the rotor having a central hub assembly with a flexure-type, twist-shank yoke with multiple arms, each arm being adapted for a rotor blade to be mounted thereto. The arms provide for pitch changes of blades attached to the yoke through twisting of portions of the arms about a corresponding pitch axis. An inboard pitch bearing associated with each arm is attached to the hub assembly and allows for rotation of the attached blade about the pitch axis, the inboard pitch bearing also allowing for out-of-plane motion of the arm relative to the hub assembly about a flapping axis. An outboard pitch bearing associated with each arm is attached to the associated arm a selected distance from the inboard pitch bearing and allows for rotation of the attached blade about the pitch axis.

The document US 2008/101934 A1 discloses an assembly for providing flexure to a blade of a rotary blade system including an upper support plate having an upper curved surface, a lower support plate having a lower curved surface, and a yoke positioned there between. An embodiment includes an assembly for providing flexure to a blade of a rotary blade system, including, an upper support plate having an upper curved surface, a lower support plate having a lower curved surface, and a yoke positioned there between and directly contacting the support plates wherein one of the curved surfaces is a non-circular arc that does not form part of the circumference of a circle.

The document U.S. Pat. No. 5,738,494 A discloses a composite flexbeam having a plurality of adjoining regions including a hub attachment region, a blade attachment region, a pitch region, an outboard transition region disposed between and adjoining the pitch region and blade attachment regions and an inboard transition region disposed between and adjoining the pitch and hub attachment regions. The inboard transition region includes a first transition subregion and a second transition subregion wherein the second transition subregion defines a width conic and a critical width transition subregion. The first and second inboard transition regions are composed of a combination of unidirectional and off-axis composite materials.

The document U.S. Pat. No. 5,096,380 A discloses a flexbeam for a bearingless helicopter rotor including a composite beam, composed of unidirectional fibers bound in an epoxy matrix, having ribs, composed of unidirectional fibers bound in a urethane matrix, bonded to each horizontal face at the section of the beam which accommodates lead-lag torsion.

The document EP 0315962 A2 discloses a helicopter rotor blade supported by a flexbeam to be rotatable about an axis of rotation, in which a pitching motion thereof is allowable. The rotor blade is provided with a device for changing the pitch and damping the lead-lag motion thereof. The device comprises a bushing in a hole formed at the inboard end of the flexbeam, an elastomeric pivot loosely fitted in the bushing, elastomeric dampers of cylindrical shape mounted on the upper and lower surfaces of the flexbeam and coupled with the upper and lower ends of the elastomeric pivot by means of nuts, and torque arms extending through the bushing and the elastomeric dampers and having the central portion thereof connected to central shafts of the elastomeric pivots. Each of the pitch sleeves has both ends outwardly projecting beyond the elastomeric dampers and secured to a pitch sleeve which encloses the flexbeam. Therefore, the relative position between the pitch sleeve and the elastomeric pivot does not change even when lead-lag motion is imparted to the rotor blade.

The document U.S. Pat. No. 4,427,340 A discloses helicopter rotors and more particularly rotor mounting involving a composite fiber-reinforced unitary yoke with resilient inplane restraints.

The document U.S. Pat. No. 6,126,398 A discloses a rotor blade for a bearingless rotor of a helicopter with a lift-generating airfoil blade, a flexbeam connecting the airfoil blade to a rotor head, and a control cuff enclosing the flexbeam. The junction between the flexbeam and the airfoil blade is a separable junction to allow the airfoil blade to be folded in a simple manner while maintaining a high lead-lag stiffness and reduced structural height of the junction. The junction is formed by two connection arms arranged side-by-side in the lead-lag plane of the rotor blade.

The document U.S. Pat. No. 6,196,800 B1 discloses a rotor blade arrangement for a bearingless rotor of a helicopter with a flexbeam connecting an airfoil blade to a rotor head, and a control sleeve surrounding the flexbeam. The control sleeve is relatively stiff, but the flexbeam has portions that are flexible so as form a fictitious flapping hinge, lead-lag hinge, and torsion axis, which respectively enable flapping, lead-lag pivoting, and torsional movements of the airfoil blade. The inboard end of the control sleeve is secured to the root end of the flexbeam near the rotor head to prevent lateral displacements there between. Damping elements are arranged within the enclosure of the control sleeve at a location between the fictitious lead-lag hinge of the flexbeam and the transition region at which the flexbeam transitions into the airfoil blade. The damping elements are preferably arranged laterally next to the flexbeam in the lead-lag plane, and are secured on the one hand to the control sleeve, and on the other hand to a securing plate that is connected to the flexbeam and the airfoil blade.

The document US 2012/087797 A1 discloses a system comprising a rotor blade, in particular of the tail rotor of a rotary wing aircraft, in a fiber-reinforced composite design, with a blade section and with a coupling section for attaching the rotor blade to the hub of a drive device, and comprising a separate sleeve-shaped control tube with an essentially hollow-cylindrical shaft, with an also essentially tubular tie section to tie the control tube to the rotor blade by sliding it onto its coupling section, is improved in that the coupling section of the rotor blade and the tie section of the control tube comprise a cross-sectional shape for positive-locking interconnection of the rotor blade and the control tube.

It is an object of the invention to provide an improved airfoil blade of a bearingless rotor of a helicopter and particularly to provide an especially simple and economical airfoil blade with a separable or releasable junction to a flexbeam/cuff unit to allow the quickest and easiest possible folding of the rotor blade, while improving the lead-lag movement transfer from the airfoil blade to the dampers of the rotor and reducing the total structural height of the junction area in order to improve drag behavior.

BRIEF SUMMARY OF THE INVENTION

The above objects have been achieved with an airfoil blade of a bearingless rotor of a helicopter with the features of claim 1 of the invention. Preferred embodiments of the invention are presented in the subclaims.

According to the invention an airfoil blade of a bearingless rotor of a helicopter, particularly an airfoil blade of a bearingless main rotor of a helicopter comprises a tip end and a root end forming opposite ends thereof with a pitch axis from said tip end to said root end. Said root end is provided with mechanical junction means for a separable junction arrangement of said airfoil blade with a flexbeam head and a control cuff with removable fasteners for removable connecting said root end of said airfoil blade to said control cuff and said flexbeam head of said bearingless rotor, said root end comprising at least two openings being asymmetric with regard to said pitch axis for preferably receiving respectively a main bolt and at least one supporting bolt as removable fasteners. Said opening for the main bolt may have a diameter greater than the diameter of the opening for said at least one supporting bolt.

Particularly according to the invention, the distances of each of the two openings from the pitch axis of the airfoil blade can be different, to optimize the folding of the airfoil blade and to improve the lead lag kinematics by increasing the distances. Particularly according to the invention, the airfoil blade includes a main opening and a supporting opening that are both arranged lying perpendicular to the lead-lag pivoting plane of the rotor blade. In this context, the lead-lag pivoting plane essentially corresponds to the rotation plane of the rotor blade. The inventive airfoil blade achieves the advantage that the lead-lag pivoting stiffness at the separable or releasable junction is substantially increased by the maximized distance between said one main opening and said supporting opening. Said main opening and said supporting opening configuration allow an integration at a suitable location of the inventive airfoil blade more easily than the arrangement of a plurality of equally charged openings provided with any of the prior art arrangements. Said main opening is located nearby the maximum thickness of the profile of the blade attachment. The invention allows a reduced total structural height at an extended width of the profile of the airfoil blade without detracting from the mechanical strength of the junction.

Consequently the inventive airfoil blade achieves to configure the control cuff with a reduced profile height at the root end of said airfoil blade and therewith provide an improved overall aerodynamic configuration without any perturbing slits in the exterior profile and/or any projecting bolts of the control cuff and/or at the root end of said airfoil blade. The junction arrangement of the invention with the large distance between said main opening and said supporting opening also takes up and transmits the lead-lag moments so as to achieve a transfer from the airfoil blade into the lead-lag stiff control cuff, allowing improved efficiency of the lead-lag dampers arranged next to the control cuff/rotor head junction subsequently allowing less complex lead-lag dampers with reduced weight, smaller size and lower costs at fabrication and/or for maintenance during operation.

The inventive airfoil blade is provided with holes for attaching the main and supporting openings. The inventive airfoil blade, the flexbeam and the control cuff are separately fabricated. The airfoil blade is attached to the flexbeam/cuff unit by the main bolt and the supporting bolt. With the inventive airfoil blade it is possible to pivot the lift-generating airfoil blade relative to the flexbeam and the control cuff in the lead-lag plane for the purpose of folding the rotor blade into a folded configuration, in a very quick and simple manner. Namely, it is simply possible to remove a single one of the fastening bolts from the inventive airfoil blade, in order to allow the airfoil blade to be pivoted about the other remaining bolt to achieve the desired rotor blade folding. With the inventive airfoil blade an easy folding in both directions, forward and rearward is possible.

According to a preferred embodiment of the invention said main opening is arranged in the area of a 10-30% chordwise axis of a profile section of said airfoil blade, preferably slightly in front of the pitch axis. With said arrangement the main bolt carries about 51-100% and the supporting bolt about 49-0% of the centrifugal and lead-lag loads.

According to a further preferred embodiment of the invention said root end of the airfoil blade is fork shaped to accommodate the flexbeam head. The flexbeam head is slit into the fork shaped root end of the airfoil blade and the control cuff surrounds the fork shaped airfoil blade.

According to a further preferred embodiment of the invention said at least one supporting opening of the root end is prepared for connecting said flexbeam head to said root end.

BRIEF DESCRIPTION OF THE SEVERAL VIEWS OF THE DRAWINGS

In order that the invention may be clearly understood it will now be described in connection with preferred example embodiments, with reference to the accompanying drawings, wherein.

DETAILED DESCRIPTION OF THE INVENTION

Figure 1:
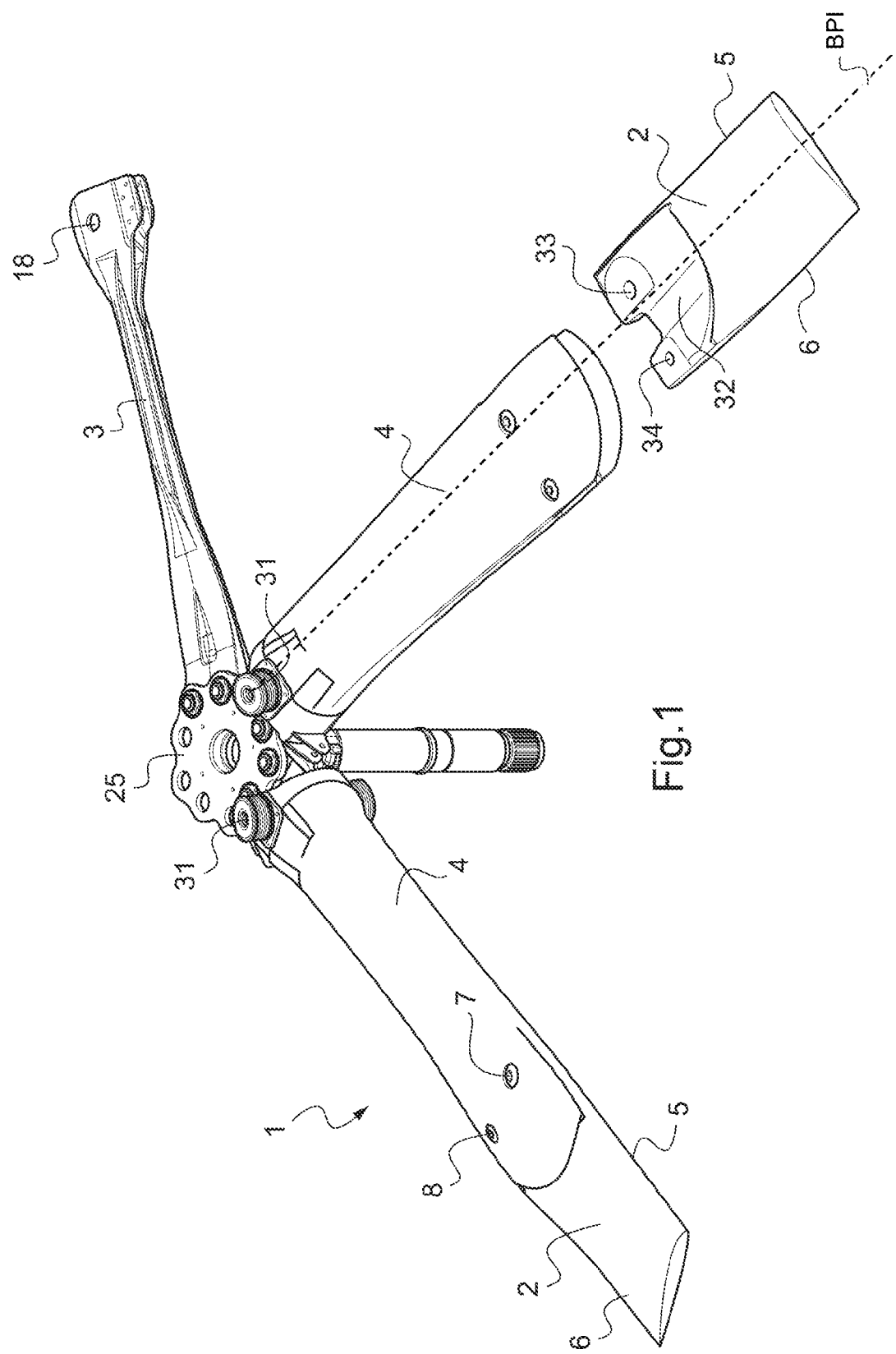
FIG. 1 is a perspective view of a rotor with a breakdown of the main components including a root end of an airfoil blade according to the invention.

According to FIG. 1 a blade attachment 1 for a bearingless rotor of a helicopter (not shown) comprises an airfoil blade 2, a flexbeam 3 and a torsion stiff control cuff or torque tube 4 enclosing the flexbeam 3. The airfoil blade 2 is mounted by means of the flexbeam 3 and the control cuff 4 to a rotor head 25. Lead lag dampers 31 are arranged on the control cuffs 4 next to the rotor head 25.

The flexbeam 3 consists of a fiber-reinforced composite material. The root end of the flexbeam 3 is secured to the rotor head 25 of the helicopter (not shown). In operation each of the airfoil blades 2 rotate about an essentially vertical rotor head axis, whereby the airfoil blades 2 rotate with their lengthwise central axis in a rotor blade plane. This rotor blade plane substantially corresponds to the lead-lag pivoting or oscillating plane of the airfoil blades 2 of the bearingless rotor of the helicopter.

Each airfoil blade 2 has a leading edge 5 and a rear edge 6, a tip end (not shown) and a root end 32. Each airfoil blade 2 has a longitudinal pitch axis BPI between said tip end and said root end 32, said pitch axis being next to 25% of the chord of the blade profile.

The root end 32 of the airfoil blade 2 and the control cuff 4 each have two matching holes 33, 34 for respectively two bolts 7, 8, namely two holes 33, 34 being asymmetric with regard to the pitch axis of the airfoil blade 2. The two bolts are a main bolt 7 and a supporting bolt 8 as a connection means of the blade attachment 1. The flexbeam 3 is provided with a hole 18 for a main bolt 7 as a connection means of the flexbeam 3 to the blade attachment 1.

Figure 2:
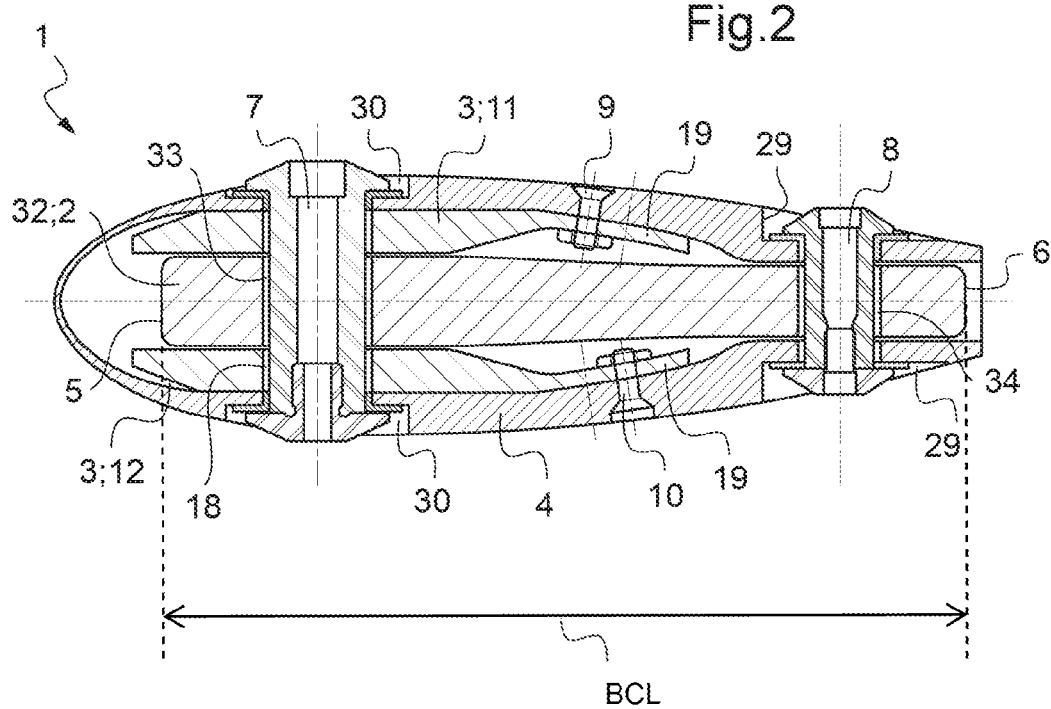
FIG. 2 is a cross sectional view of the blade attachment for the airfoil blade according to the invention.

According to FIG. 2 corresponding features are referred to with identical references. The root end 32 of the airfoil blade 2, the control cuff 4 and the flexbeam 3 each have coaxially an opening 33, 18 for a main bolt 7 as a connection means of the blade attachment 1. Said opening 33 for the main bolt 7 is in the area of a 25% pitch axis of a profile section for said airfoil blade 2 at about a maximal height of the blade attachment 1. The root end 32 of the airfoil blade 2 and the control cuff 4 each have coaxially a further opening 34 for a supporting bolt 8 as a connection means of the blade attachment 1. Said opening 34 for the supporting bolt 8 are distant from the opening 33 for the main bolt 7 in an area at the rear edge 6 of the airfoil blade 2.

The main bolt 7 has a greater diameter than the supporting bolt 8 to allow a load of 60% of the centrifugal loads of the airfoil blade 2 to be carried by said main bolt 7. The main opening 33 is located at 10%-30% of the chord length BCL from the leading edge 5 of the airfoil blade 2. The supporting opening 34 is located at 50%-90% of the chord length BCL of the airfoil blade 2. The distance of the main opening 33 from the supporting opening 34 is between 40% to 80% of the chord length BCL of the airfoil blade 2.

The main bolt 7 and the supporting bolt 8 together with any screw nuts are integrated aerodynamically into respectively associated corrugations 29, 30 of said control cuff 4.

The control cuff 4 is riveted at upper and lower mechanical connections 9, 10 to an upper fork flange 11 and a lower fork flange 12 of a fork shaped head 13 of the flexbeam 3. Additionally the control cuff 4 adheres to the upper fork flange 11 and the lower fork flange 12 of the fork shaped head 13 of the flexbeam 3. The control cuff 4 is built up with carbon layers with an orientation of +/−45°.

Figure 3:
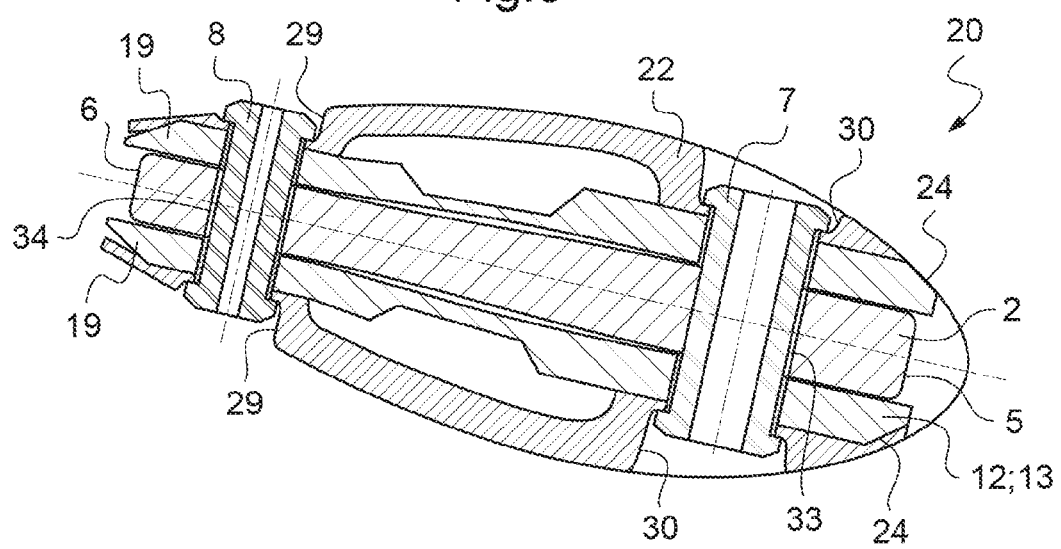
FIG. 3 is a cross sectional view of a further blade attachment for the airfoil blade according to the invention.

According to FIG. 3 corresponding features are referred to with the same references as in FIG. 1-5. FIG. 6 exhibits a variation of FIG. 1, in so far as a modified flexbeam 21 is directly connected to the root end 32 of the airfoil blade 2 with the supporting bolt 8. A further blade attachment 20 for a bearingless rotor of a helicopter comprises the airfoil blade 2, the flexbeam 21 and a torsion stiff control cuff 22 enclosing the flexbeam 21. The flexbeam 21 consists of fiber-reinforced composite material. The airfoil blade 2 has the leading edge 5 and the rear edge 6.

The root end 32 of the airfoil blade 2, the control cuff 22 and the flexbeam 21 each have coaxially an opening for a main bolt 7 as a connection means of the further blade attachment 20. Said opening 33 in said airfoil blade 2 for the main bolt 7 is in the area of the 25% axis of the profile section at about a maximal height of the further blade attachment 20. The root end 32 of the airfoil blade 2, the control cuff 22 and the flexbeam 21 each have coaxially a further opening 34 for a supporting bolt 8 as a connection means of the further blade attachment 20. Said opening 34 for said airfoil blade 2 for the supporting bolt 8 is in an area at the rear edge 6 of the airfoil blade 2 distant from the opening 33 for the main bolt 7.

The main bolt 7 and the supporting bolt 8 together with any screw nuts are integrated aerodynamically into respectively associated corrugations 29, 30 of said control cuff 22.

The control cuff 22 is fixed to the upper fork flange 11 and the lower fork flange 12 of a fork shaped head 13 of the flexbeam 21.

Figure 4:
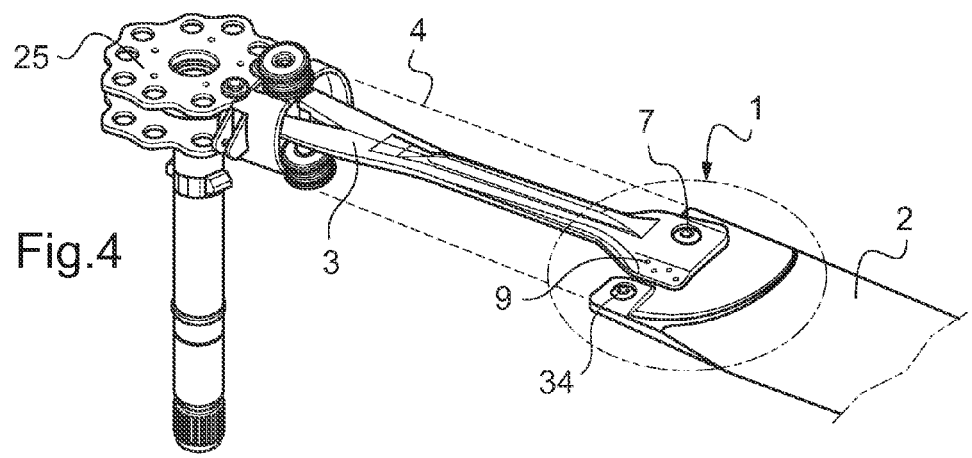
FIG. 4 is a perspective view of the cut open blade attachment with the root end of the airfoil blade according to the invention

According to FIG. 4 corresponding features are referred to with the same references as in FIG. 1-3. The blade attachment 1 for a bearingless rotor of a helicopter connects the root end 32 of the airfoil blade 2 to the flexbeam 3. Only a section of the torsion stiff control cuff 4 next to the rotor head 25 is shown. The flexbeam 3 is provided with the main bolt 7 and with holes for the upper mechanical connections 9 for the control cuff 4. The root end 32 of the airfoil blade 2 is provided with an opening 34 for the supporting bolt 8.

Figure 5:
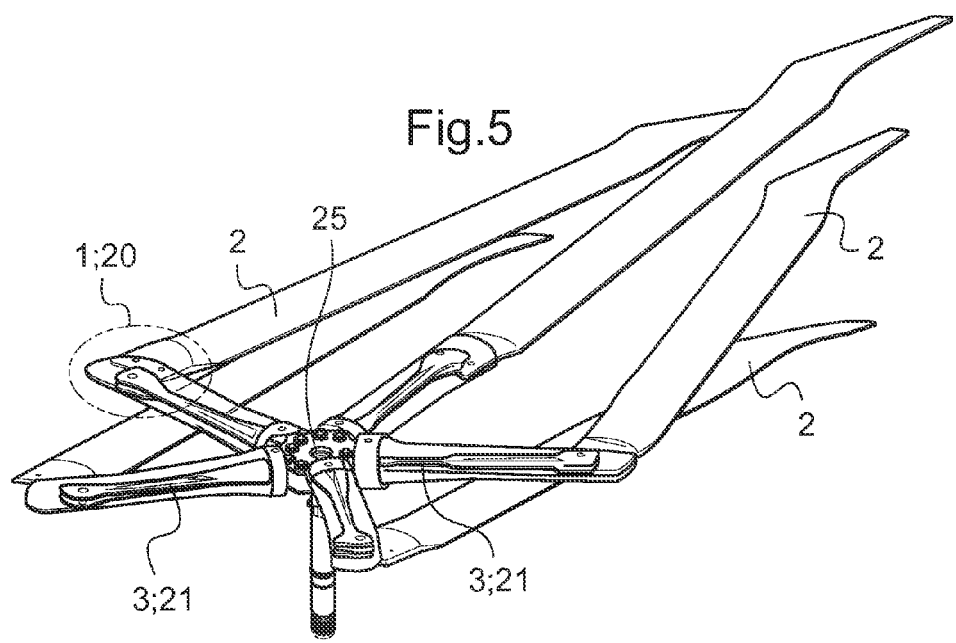
FIG. 5 is a perspective view of the blade attachment with folded airfoil blades according to the invention.
Figure 6:
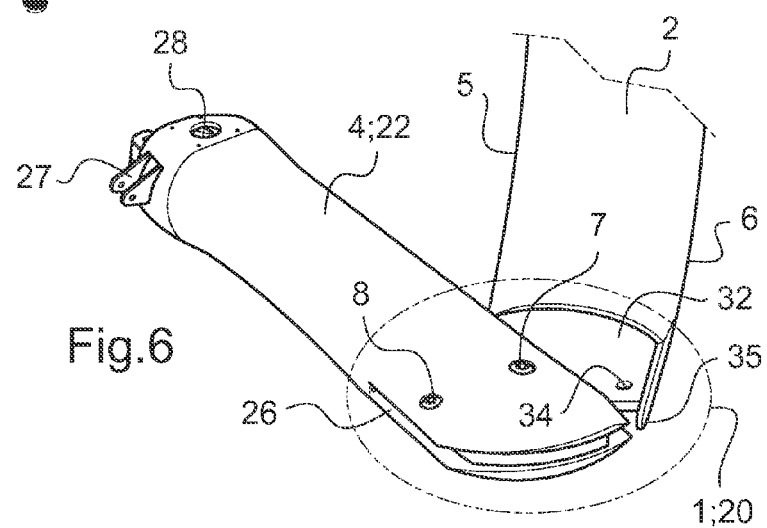
FIG. 6 is a perspective view of the blade attachment with the root end of one folded airfoil blade according to the invention.

According to FIG. 5 corresponding features are referred to with the same references as in FIG. 1-4. Two of five airfoil blades 2 are pivoted forward relative to the flexbeams 3, 21 and another two of said five airfoil blades 2 are pivoted rearward relative to the flexbeams 3, 21 around their respective blade attachments 1, 20 in essentially parallel arrangement to each other and to a non-pivoted airfoil blade 2.

According to FIG. 6 corresponding features are referred to with the same references as in FIG. 1-5. The control cuff 4, 22 is provided with a frontal slit adjacent to said leading edge 5 and a rear slit 26 adjacent to the rear edge 6 of the root end 32 of the airfoil blade 2, to allow pivoting of the airfoil blades 2. For forward pivoting of the airfoil blade 2 the main bolts 7 remain in place and the supporting bolts 8 have to be released from the opening 34 and the airfoil blade 2 has to be pivoted forward. For rearward pivoting of the airfoil blade 2 the supporting bolts 8 remain in place and the main bolts 7 have to be released from the respective blade attachments 1, 20 and the airfoil blade 2 has to be pivoted rearward. The root end 32 of the airfoil blade 2 is provided with a lateral cover 35 for the rear slit 26.

The control cuff 4, 22 is provided with a flange 27 for pitch control of the airfoil blades 2 and a reception 28 for a lead-lag damper 31. The transition from the flange 27 of the control cuff 4, 22 towards the junction arrangement is provided with elliptic cross sections with a flat laminated bearing of hole at the junction arrangement.

REFERENCE LIST 1 blade attachment
2 airfoil blade
3 flexbeam
4 control cuff
5 leading edge
6 rear edge
7 main bolt
8 supporting bolt
9 upper mechanical connection
10 lower mechanical connection
11 upper fork flange
12 lower fork flange
13 fork shaped head
14 gap
18 hole
19 rearward oriented ends
20 blade attachment
21 flexbeam
22 control cuff
23 upright bar
24 chamfer
25 rotor head
26 rear slit
27 flange
28 reception
29 corrugation
30 corrugation
31 lead lag damper
32 root end
33 main opening airfoil blade
34 supporting opening airfoil blade

What is claimed is:

1. An airfoil blade comprising:
a root end;
a tip end; and
a body extending between the root end and the tip end with a pitch axis extending from the root end to the tip end, wherein the root end defines a chordwise axis extending perpendicular to the pitch axis and includes a first fastener hole and a second fastener hole aligned along the chordwise axis, the first and second fastener holes extending through the root end of the airfoil blade from a top surface of the root end of the airfoil blade to a bottom surface of the root end of the airfoil blade, the first and second fastener holes being configured to receive first and second fasteners, respectively, to couple the root end to a control cuff and a flexbeam head, the first fastener hole having a first diameter and being spaced a first distance from the pitch axis, the second fastener hole having a second diameter and being spaced a second distance from the pitch axis, the first distance being different from the second distance, the first diameter being larger than the second diameter, wherein the first fastener hole is between the leading edge and second fastener hole.

2. The airfoil blade of claim 1, wherein the pitch axis passes through the root end at 25% of the chord length from a leading edge.

3. The airfoil blade of claim 1, wherein the first fastener hole passes through the root end at between 10% and 30% of the chord length from a leading edge.

4. The airfoil blade of claim 3, wherein the first diameter is greater than the second diameter.

5. The airfoil blade of claim 3, wherein the second fastener hole passes through the root end at between 50% and 90% of the chord length from the leading edge.

6. The airfoil blade of claim 1, wherein the distance from the first fastener hole to the second fastener hole is between 40% and 80% of the chord length.

7. The airfoil blade of claim 1, wherein the root end is fork-shaped to accommodate a flexbeam head.

8. A rotorcraft comprising:
a rotor head;
a flexbeam having a flexbeam root and a flexbeam head, the flexbeam root being coupled to the rotor head;
a control cuff extending about a portion of the flexbeam, the control cuff having a first control cuff hole and a second control cuff hole;
a rotor blade having a blade root, a blade tip, and a body extending therebetween with a pitch axis extending from the blade root to the blade tip, the blade root defining a chordwise axis extending perpendicular to the pitch axis, the blade root having a first fastener hole and a second fastener hole aligned along the chordwise axis, the first fastener hole coaxial with the first control cuff hole, the first fastener hole having a first diameter and being spaced a first distance from the pitch axis, the second fastener hole coaxial with the second control cuff hole, the second fastener hole having a second diameter and being spaced a second distance from the pitch axis, the first distance being different from the second distance, the first diameter being different from the second diameter;
a first fastener disposed within the first control cuff hole and the first fastener hole; and
a second fastener disposed within the second control cuff hole and the second fastener hole.

9. The rotorcraft of claim 8, wherein the pitch axis passes through the blade root at 25% of the chord length from a leading edge.

10. The rotorcraft of claim 8, wherein the first fastener hole passes through the blade root at between 10% and 30% of the chord length from a leading edge.

11. The rotorcraft of claim 10, wherein the first diameter is greater than the second diameter.

12. The rotorcraft of claim 10, wherein the second fastener hole passes through the blade root at between 50% and 90% of the chord length from the leading edge.

13. The rotorcraft of claim 8, wherein the distance from the first fastener hole to the second fastener hole is between 40% and 80% of the chord length.

14. The rotorcraft of claim 8, wherein the blade root is fork-shaped to accommodate the flexbeam head.

15. The rotorcraft of claim 8, wherein the first control cuff hole has a first control cuff hole diameter and the second control cuff hole has a second control cuff hole diameter, the first control cuff hole diameter being different from the second control cuff hole diameter.

16. An airfoil blade of a bearingless rotor of a helicopter comprising:
    the airfoil blade being integrally formed and having a tip end and a root end forming opposite ends thereof and having a pitch axis from the tip end to the root end;
    the root end being provided with removable fasteners, each fastener removable connecting the root end of the airfoil blade to a control cuff and a flexbeam head, the root end of the airfoil blade defining a chordwise axis extending perpendicular to the pitch axis, the root end comprising at least two openings aligned along the chordwise axis and being asymmetric with regard to the pitch axis, the two asymmetric openings including a main opening and a supporting opening, the main opening having a greater diameter than the supporting opening, the main opening being located at 10-30% chord length of the airfoil blade from a leading edge of a profile section, and the supporting opening being located at 50-90% chord length of the airfoil blade from the leading edge.

17. The airfoil blade according to claim 16, wherein the main opening is arranged in front of the axis towards the leading edge.

18. The airfoil blade according to claim 16, wherein the root end is fork shaped to accommodate the flexbeam head.

19. The airfoil blade according to claim 16, wherein the supporting opening of the root end is prepared for connecting the flexbeam head to the root end.

20. The airfoil blade of claim 16, wherein the main opening and the supporting opening are both spaced away from the pitch axis.

\* \* \* \* \*